US008740736B2

(12) United States Patent  
Kurematsu et al.

(10) Patent No.: US 8,740,736 B2  
(45) Date of Patent: Jun. 3, 2014

(54) RING-TYPE TENSIONER

(75) Inventors: Yuji Kurematsu, Osaka (JP); Osamu Yoshida, Osaka (JP); Munehiro Maeda, Osaka (JP); Akira Ishii, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 73 days.

(21) Appl. No.: 13/477,345

(22) Filed: May 22, 2012

(65) Prior Publication Data  
US 2012/0309570 A1 Dec. 6, 2012

(30) Foreign Application Priority Data  
Jun. 2, 2011 (JP) ................................. 2011-124058

(51) Int. Cl.  
*F16H 7/22* (2006.01)  
*F16H 7/08* (2006.01)

(52) U.S. Cl.  
USPC .......................................................... 474/110

(58) Field of Classification Search  
CPC .......... F16H 7/0848; F16H 2007/0806; F16H 2007/0812; F16H 2007/0855; F16H 2007/0891  
USPC .......................................................... 474/110  
See application file for complete search history.

(56) References Cited

U.S. PATENT DOCUMENTS

| | | | | |
|---|---|---|---|---|
| 4,792,322 A | * | 12/1988 | Goppelt et al. | 474/136 |
| 5,931,754 A | * | 8/1999 | Stief et al. | 474/109 |
| 5,989,139 A | * | 11/1999 | Dusinberre et al. | 474/110 |
| 6,120,402 A | * | 9/2000 | Preston et al. | 474/109 |
| 6,126,563 A | * | 10/2000 | Simpson | 474/110 |
| 6,244,981 B1 | * | 6/2001 | Simpson | 474/110 |
| 6,435,992 B2 | * | 8/2002 | Wakabayashi et al. | 474/101 |
| 6,817,958 B2 | * | 11/2004 | Kaido et al. | 474/101 |
| 6,916,264 B2 | * | 7/2005 | Hashimoto et al. | 474/109 |
| 6,935,978 B2 | * | 8/2005 | Hayakawa et al. | 474/109 |
| 7,189,174 B2 | * | 3/2007 | Yamamoto et al. | 474/109 |
| 7,455,607 B2 | * | 11/2008 | Narita et al. | 474/109 |
| 7,527,572 B2 | * | 5/2009 | Sato et al. | 474/109 |
| 7,559,863 B2 | * | 7/2009 | Onimaru et al. | 474/110 |

(Continued)

FOREIGN PATENT DOCUMENTS

| | | |
|---|---|---|
| JP | 20100091064 A | 4/2010 |
| KR | 20030025381 A | 3/2003 |
| WO | 2009000354 A1 | 12/2008 |
| WO | WO 2009024196 A1 * | 2/2009 ................ F16H 7/08 |

OTHER PUBLICATIONS

Unpublished U.S. Appl. No. 13/474,792 for Ratchet-Type Tensioner.

(Continued)

*Primary Examiner* — William A Rivera  
*Assistant Examiner* — Henry Liu  
(74) *Attorney, Agent, or Firm* — Howson & Howson LLP

(57) ABSTRACT

In a ring-type tensioner, an expansible elastic ring disposed in a groove formed in the wall of a plunger-accommodating hole cooperates with teeth formed on the plunger to restrict axial movement of the plunger. The ring and the groove in the wall of the plunger-accommodating hole have flat radial surfaces for mutual engagement. However the ring also has oblique plunger-tooth engaging surfaces. The ring has manipulable end parts that can be locked in fixed relation to each other by a tool to secure the plunger against axial movement. The tool can also be inserted into a gap between the manipulable end parts to expand the ring and thereby release the plunger.

4 Claims, 14 Drawing Sheets

(56) References Cited

U.S. PATENT DOCUMENTS

| | | | |
|---|---|---|---|
| 7,571,632 B2* | 8/2009 | Yamamoto et al. | 72/370.21 |
| 7,677,999 B2* | 3/2010 | Sato et al. | 474/109 |
| 7,775,921 B2* | 8/2010 | Izutsu et al. | 474/110 |
| 8,257,212 B2* | 9/2012 | Yoshimura et al. | 474/110 |
| 2003/0139235 A1* | 7/2003 | Yamamoto et al. | 474/109 |
| 2004/0092348 A1* | 5/2004 | Hashimoto et al. | 474/109 |
| 2004/0138018 A1* | 7/2004 | Hayakawa et al. | 474/122 |
| 2004/0266571 A1* | 12/2004 | Izutsu et al. | 474/110 |
| 2006/0094548 A1* | 5/2006 | Sato et al. | 474/109 |
| 2006/0281595 A1* | 12/2006 | Narita et al. | 474/109 |
| 2010/0016105 A1* | 1/2010 | Yoshimura et al. | 474/110 |
| 2010/0222167 A1* | 9/2010 | Chekansky et al. | 474/110 |
| 2011/0021298 A1* | 1/2011 | Kurematsu et al. | 474/110 |
| 2011/0183796 A1* | 7/2011 | Kurematsu et al. | 474/110 |
| 2011/0195810 A1* | 8/2011 | Perissinotto | 474/101 |
| 2012/0196709 A1 | 8/2012 | Kurematsu | |
| 2012/0225743 A1 | 9/2012 | Ishii | |
| 2012/0244975 A1 | 9/2012 | Kurematsu | |

OTHER PUBLICATIONS

British Search Report, issued in British counterpart application No. GB1208142.8.

* cited by examiner

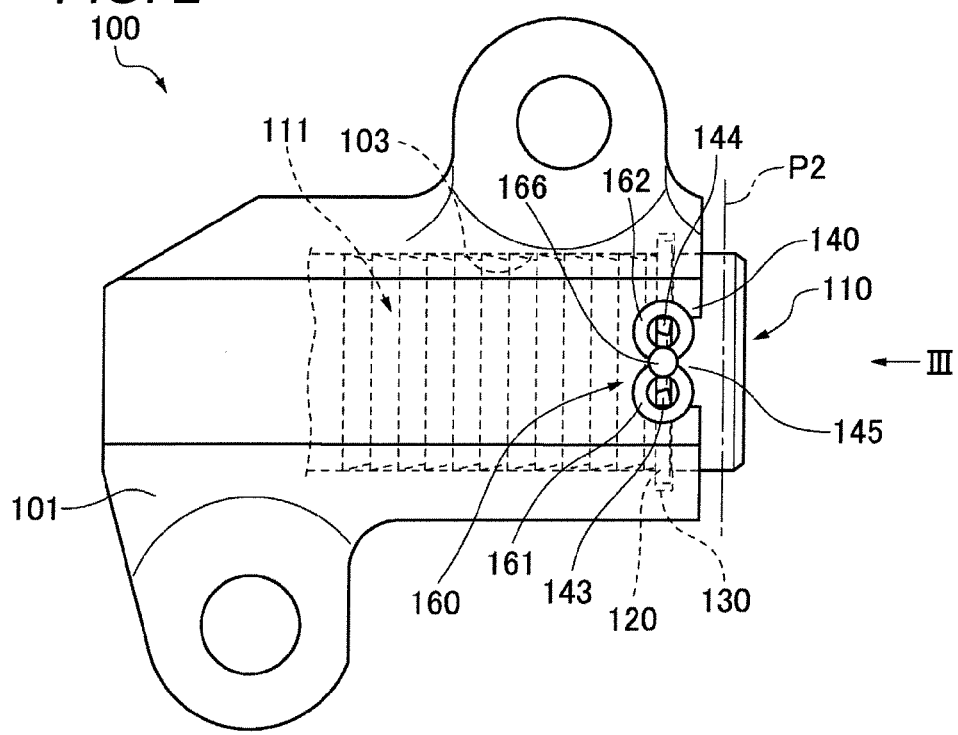
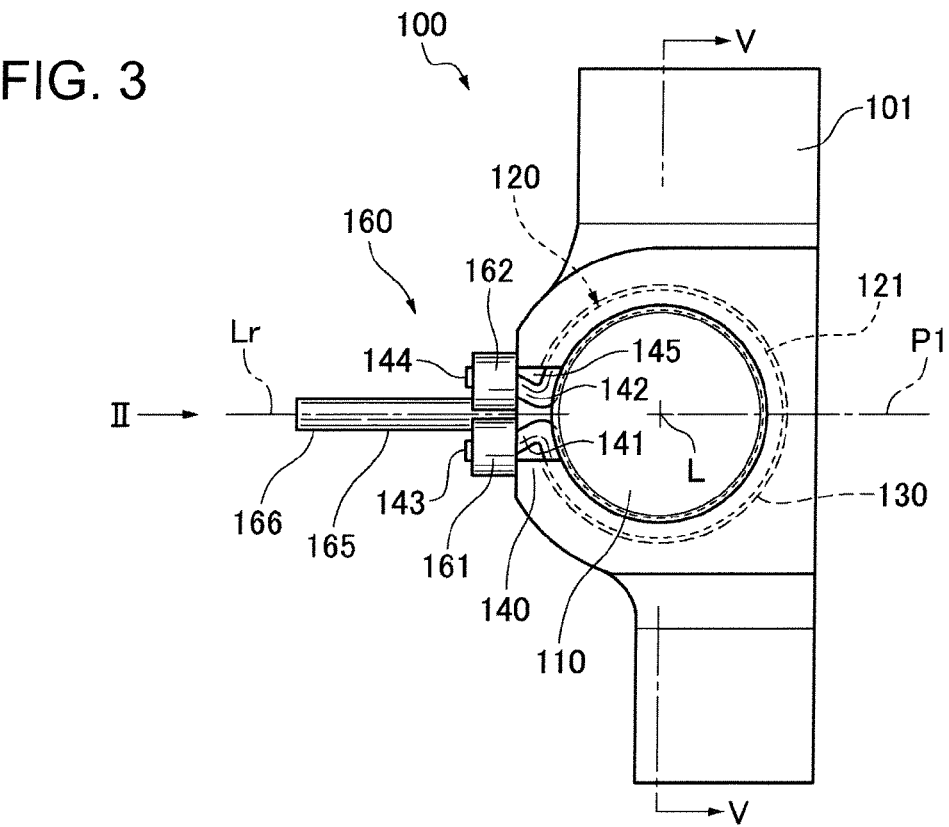

AXIAL DIRECTION
SETBACK DIRECTION ← → ADVANCE DIRECTION

AXIAL DIRECTION
SETBACK DIRECTION ← → ADVANCE DIRECTION

RING-TYPE TENSIONER

CROSS REFERENCE TO RELATED APPLICATIONS

This application claims priority on the basis of Japanese Patent Application No. 2011-124058, filed Jun. 2, 2011. The disclosure of Japanese Patent Application 2011-124058 is herein incorporated by reference.

FIELD OF THE INVENTION

The invention relates to a tensioner for applying tension to an engine timing chain or other endless flexible transmission chain for transmitting motion from a driving sprocket to one or more driven sprockets. It relates specifically to a ring-type tensioner comprising an elastic ring used to restrict retraction of a plunger that maintains tension in the transmission chain.

BACKGROUND OF THE INVENTION

United States Patent Application Publication No. 2011/0021298, published Aug. 17, 2010, and U.S. Pat. No. 7,775,921, granted Jan. 27, 2011 describe ring-type tensioners comprising a housing, a plunger-accommodating hole in the housing, a plunger movable in, and protruding from, the plunger-accommodating hole for applying tension to a chain, and a radially expansible elastic ring surrounding the plunger and cooperating with teeth on the outer peripheral surface of the plunger to restrict retracting movement of the plunger.

The rings of the prior art have circular cross-sections. That is, the cross-section of the ring material taken on a plane parallel to the axis of the ring is circular. Because of its circular cross-section, the ring comes into line contact with the wall of the groove in which it is situated. Line contact causes high contact pressure, resulting in excessive wear.

Wear of the elastic ring, in turn, can result in instability in the control of chain tension, and in a condition in which the ring is caught between the plunger and the housing, a phenomenon known as "bit-locking."

If the plunger protrudes excessively, due to thermal contraction of the engine or to thermal expansion of the chain, excessive tension can be generated in the chain. The condition of excessive tension in the chain can continue because the engagement of the teeth of the plunger with the ring prevents the plunger from being set back.

The plunger is biased in the advancing direction both by a plunger-biasing spring and by the pressure of oil supplied to an oil chamber formed by the housing and the plunger.

If air enters the oil chamber of the tensioner while the engine is stopped, the hydraulic pressure in the oil chamber can become incapable of preventing retraction of the plunger. Therefore, when the engine is started, excessive setback movement of the plunger in reaction to the force applied to the plunger by the chain can result in the generation of a flapping noise in by the chain.

In the prior art ring-type tensioners, when the plunger is installed in, or removed from, the tensioner housing, the elastic ring is expanded manually. Manual expansion is difficult to carry out smoothly because, it is necessary for an individual to use fingers to hold both ends of the elastic ring.

It is also desirable to prevent the plunger from jumping out of the plunger-accommodating hole of the tensioner housing during assembly and transportation of the tensioner.

Because of the problems described above, there is a need for a ring-type tensioner that is less subject to wear at the locations at which the ring contacts the plunger and the housing, and to prevent bit-locking caused by wear. There is also a need for a ring-type tensioner that can avoid excessive chain tension, eliminate the generation of flapping noises by the chain, and securely prevent the plunger of the tensioner from jumping out of the tensioner housing, and for a ring tensioner that can be more easily assembled and maintained.

SUMMARY OF THE INVENTION

The ring-type tensioner according to the invention comprises a housing having a plunger-accommodating hole having an axis. A plunger extends into, and protrudes from, the plunger-accommodating hole, and is movable therein along the direction of the axis for maintaining tension in a flexible traveling transmission medium. A spring biases the plunger in its protruding direction, and an elastic ring, capable of radial expansion and contraction, is disposed around the plunger. Axial movement of the plunger is restricted by engagement of an engagement surface of the plunger with an engagement portion of the elastic ring. A portion of the elastic ring is disposed within a groove formed in a circumferential wall of the plunger-accommodating hole. The groove having a radial wall and the ring having a radial abutment surface arranged to abut the radial wall surface of the groove. The radial ring surface has a straight profile in an axial plane containing the axis of the plunger-accommodating hole.

The profile of the radial wall of the groove can also be straight in the same axial plane so that the radial ring surface can come into face-to-face area contact with the radial wall surface of the groove. The straight profiles of the ring surfaces help to prevent bit-locking caused by wear of the ring by reducing contact pressure. Avoidance of bit-locking is enhanced when the radial walls of the groove in the plunger-accommodating hole also have straight profiles.

Both the radial ring surface and the radial wall of the groove can be planar. In this case, frictional forces can be reduced and the responsiveness of the plunger in controlling the tension in a transmission chain can be improved.

In an embodiment of the tensioner, the engagement surface of the plunger can be a surface of one of a plurality of grooves formed on the plunger, the grooves being disposed at intervals along the direction of the axis of the plunger-accommodating hole and of the plunger. Each of the grooves is a circumferential groove curved in the circumferential direction. The engagement portion of the elastic ring is composed of forward-facing and rearward-facing surfaces, and the engagement surface of the plunger is also composed of forward-facing and rearward-facing surfaces. The forward facing radial wall of the groove in the plunger-accommodating hole is disposed for face-to-face contact with the ring when the plunger is moved in the setting back direction, and can be curved in the circumferential direction of the groove in the plunger-accommodating hole.

The face-to-face contact suppresses wear of the ring and the wall surfaces of the groove in which the ring is situated, and assists in preventing bit-locking.

Each of the grooves on the plunger can have a rearward-facing inclined surface for contacting the ring when the plunger sets back, and a forward-facing inclined surface for contact with the ring when the plunger advances. The angle of the rearward-facing inclined surface of each groove relative to a radial plane to which the axis of the plunger-accommodating hole is perpendicular should be sufficiently small to block setback movement of the plunger when a first force is applied to the plunger, but sufficiently large to allow setback movement of the plunger when a second force greater than the first force is applied to the plunger. Accordingly, the plunger can set back when a predetermined excessive tension is generated in an endless traveling transmission medium in which tension is maintained by the tensioner, but is prevented from setting back when the tension in the transmission medium is lower than the predetermined excessive tension.

Because the plunger is prevented from setting back under normal conditions, such as engine-start-up, but is allowed to set back when tension in the transmission medium becomes excessive, it is possible to reduce flapping noises generated by the transmission medium.

The ring can have an inclined forward-facing surface arranged to contact the rearward-facing inclined surface of a groove in the plunger, and a rearward-facing inclined surface arranged to contact the forward-facing inclined surface of a groove in the plunger. Each of the inclined surfaces of the ring and the plunger can have a straight profile. The angle of the rearward-facing inclined surface of each groove in the plunger is smaller than the angle of the forward-facing inclined surface of the same groove in the plunger and the angle of the forward-facing inclined surface of the ring is smaller than the angle of the rearward-facing inclined surface of the ring. The angle of the forward-facing inclined surface of the ring is smaller than the angle of the rearward facing inclined surface of each of the grooves, and the angle of the rearward-facing inclined surface of the ring is also smaller than the angle of the forward facing inclined surface of each of the grooves. Each of these angles is measured relative to a radial plane to which the axis of the plunger-accommodating hole is perpendicular. In this case it is possible to achieve a performance in a ring tensioner comparable to that of a tensioner having a ratchet piston.

Alternatively, the angle of the forward-facing inclined surface of the ring can be equal to the angle of the rearward facing inclined surface of each of the grooves and the angle of the rearward-facing inclined surface of the ring is equal to the angle of the forward facing inclined surface of each of the grooves. In this case, because contact pressure is reduced, the rate of wear of the elastic ring is also reduced.

In an embodiment of the invention, in which the engagement surface of the plunger is a surface of one of a plurality of grooves formed on the plunger, the grooves being disposed at intervals along the direction of the axis of the plunger-accommodating hole, each of the grooves of the plurality of grooves can be a straight groove disposed in a direction orthogonal to the axis. The profiles of the radial walls of the groove of the circumferential wall of the plunger-accommodating hole in the axial plane are straight, and the radial ring surfaces can come into face-to-face area contact with the radial wall surfaces of the groove.

As in the case in which the grooves of the plunger are circumferentially curved, in the embodiment in which the grooves are straight, each of the grooves on the plunger can have a rearward-facing inclined surface for contacting the ring when the plunger sets back, and a forward-facing inclined surface for contact with the ring when the plunger advances. The angle of the rearward-facing inclined surface of each groove relative to a radial plane to which the axis of the plunger-accommodating hole is perpendicular should be sufficiently small to block setback movement of the plunger when a first force is applied to the plunger, but sufficiently large to allow setback movement of the plunger when a second force greater than the first force is applied to the plunger. Accordingly, the plunger can set back when a predetermined excessive tension is generated in an endless traveling transmission medium in which tension is maintained by the tensioner, but is prevented from setting back when the tension in the transmission medium is lower than the predetermined excessive tension.

Moreover, as in the case in which the grooves of the plunger are circumferentially curved, the ring can have an inclined forward-facing surface arranged to contact the rearward-facing inclined surface of a groove in the plunger, and a rearward-facing inclined surface arranged to contact the forward-facing inclined surface of a groove in the plunger. Each of the inclined surfaces of the ring and the plunger can have a straight profile. The angle of the rearward-facing inclined surface of each groove in the plunger is smaller than the angle of the forward-facing inclined surface of the same groove in the plunger and the angle of the forward-facing inclined surface of the ring is smaller than the angle of the rearward-facing inclined surface of the ring. The angle of the forward-facing inclined surface of the ring is smaller than the angle of the rearward facing inclined surface of each of the grooves, and the angle of the rearward-facing inclined surface of the ring is also smaller than the angle of the forward facing inclined surface of each of the grooves. Here again as an alternative, the angle of the forward-facing inclined surface of the ring can be equal to the angle of the rearward facing inclined surface of each of the grooves, and the angle of the rearward-facing inclined surface of the ring can be equal to the angle of the forward facing inclined surface of each of the grooves.

According to another aspect of the invention, the elastic ring has manipulable parts for manual expansion or contraction the ring. A ring-diameter retaining tool can be engaged with the manipulable parts to hold the manipulable parts in fixed relation to each other so that the ring is prevented from expanding sufficiently to allow the ring to disengage a groove of the plunger in which it is situated, and the plunger is thereby prevented from moving axially out of the plunger-accommodating hole while the tensioner is being transported and while the tensioner is being assembled or installed on an engine.

According to still another aspect of the invention, the manipulable parts of the ring are located on the ring so that they are separated from each other circumferentially by a gap when the ring is in engagement with a groove of the plunger and the ring diameter retaining tool is not retaining the manipulable parts in fixed relation to each other. The ring-diameter retaining tool includes a part insertable into the gap when the tool is not retaining the manipulable parts in fixed relation to each other. The thickness of the insertable part of the tool is larger than the gap, and sufficiently large to expand the ring to a diameter greater than the maximum diameter of the plunger at the locations of the grooves. Therefore, by insertion of the insertable part of the tool into the gap, the plunger can be released from the ring and allowed to move axially in the plunger-accommodating hole. Accordingly, it is possible to facilitate assembly and maintenance of the tensioner.

These and other features and advantages of the invention will become more apparent upon consideration of the following description of the preferred embodiments of the invention, taken in conjunction with the accompanying drawings.

BRIEF DESCRIPTION OF THE DRAWINGS

FIG. 2 is an elevation of the tensioner as viewed along the direction of arrow II in FIG. 3;

FIG. 3 is an elevation of the tensioner as viewed along the direction of arrow III in FIG. 2

DETAILED DESCRIPTION OF THE PREFERRED EMBODIMENTS

Figure 1:
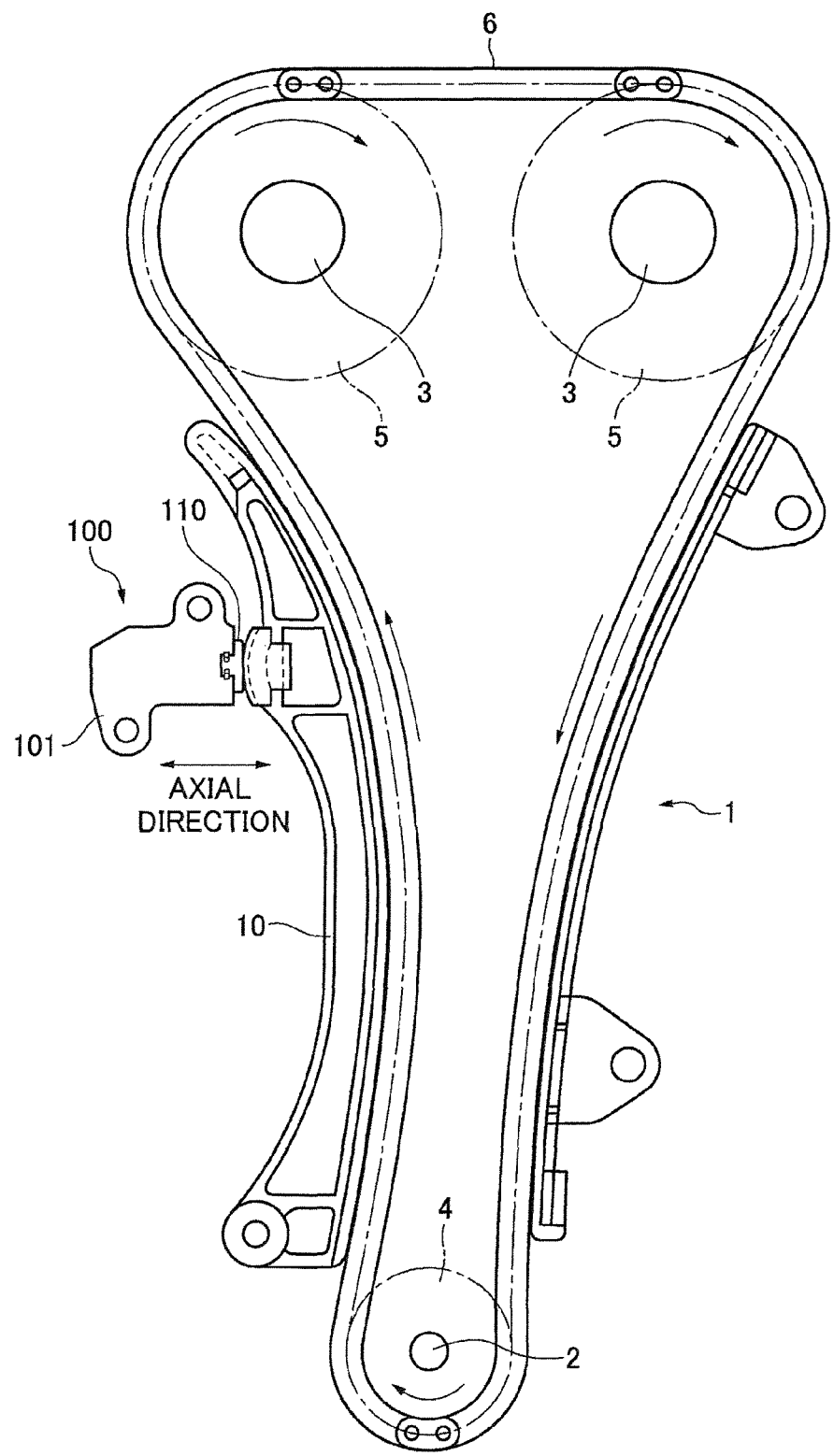
FIG. 1 is a schematic front elevational view of the timing drive of an internal combustion engine incorporating ring-type tensioner according to the invention.

As shown in FIG. 1, a ring-type tensioner 100 according to a first embodiment of the invention is provided in a timing chain transmission 1 of a DOHC (dual overhead cam) internal combustion engine (not shown). The timing chain transmission 1 comprises a driving sprocket 4 rotatably driven by an engine crankshaft 2, a pair of driven sprockets 5 respectively fixed to a pair of camshafts 3, and an endless timing chain 6 in mesh with teeth of sprockets 4 and 5.

The tensioner 100 is mounted on the engine on the slack side of the chain 6, i.e., adjacent the span of the chain that travels from the crankshaft sprocket 4 toward one of the camshaft sprockets 5. The tensioner comprises a housing 101 and a plunger 110 that is movable in an axial direction in and out of the housing 101 to apply tension to the chain 6 through a pivoted lever 10 supported on the engine. The plunger 110 presses against the lever 10 at a location remote from the lever's pivot axis, maintaining tension in the chain, but is movable in a retracting or "set back" direction to reduce the tension in the chain.

Figure 5A:
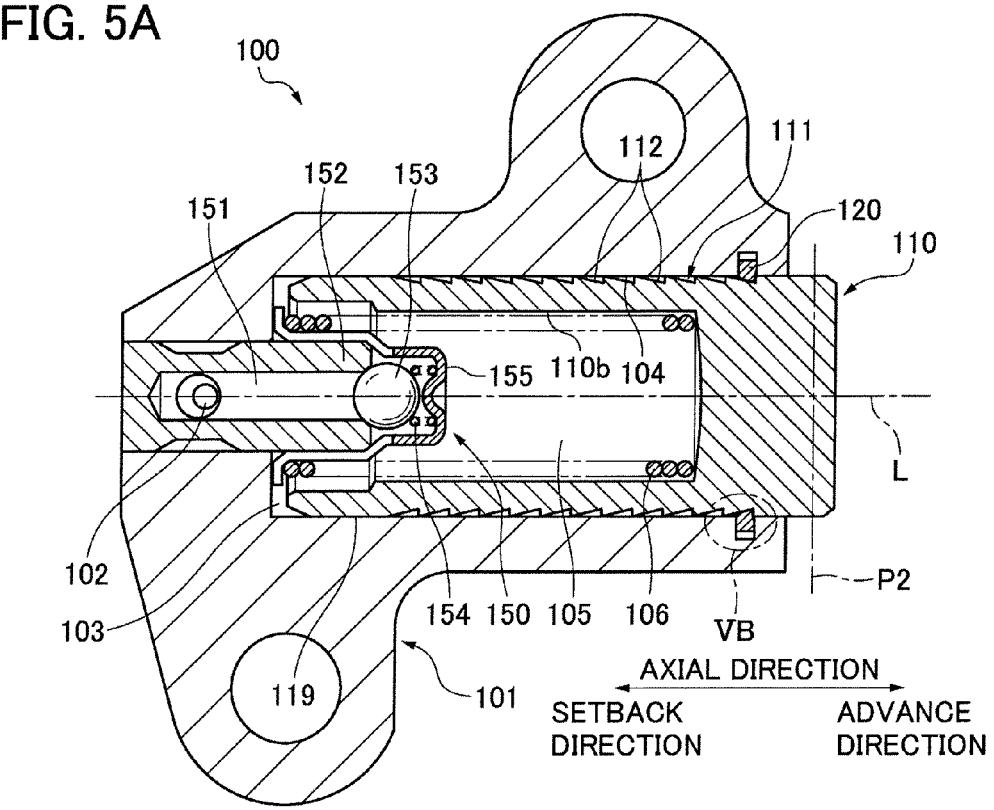
FIG. 5A is a section view of the tensioner taken on plane V-V in FIG. 3.

As shown in FIG. 5A, an oil supply passage 102 in the housing 101 supplies oil under pressure to a plunger-accommodating hole 1031, from which the plunger 110 protrudes and in which the plunger is supported form movement forward and backward in the direction of the axis L, of the plunger-accommodating hole 103. An elastic ring 120, which is capable of radial expansion and contraction, is disposed around the circumference of the plunger 110. An oil chamber 105 is formed by the plunger-accommodating hole 103 and the wall 110b of the plunger 110, which is hollow and has an opening facing the bottom of the plunger-accommodating hole. A plunger-biasing spring 106 is disposed within the oil chamber 105 and generates a biasing force urging the plunger 110 in the protruding direction.

Figure 5B:
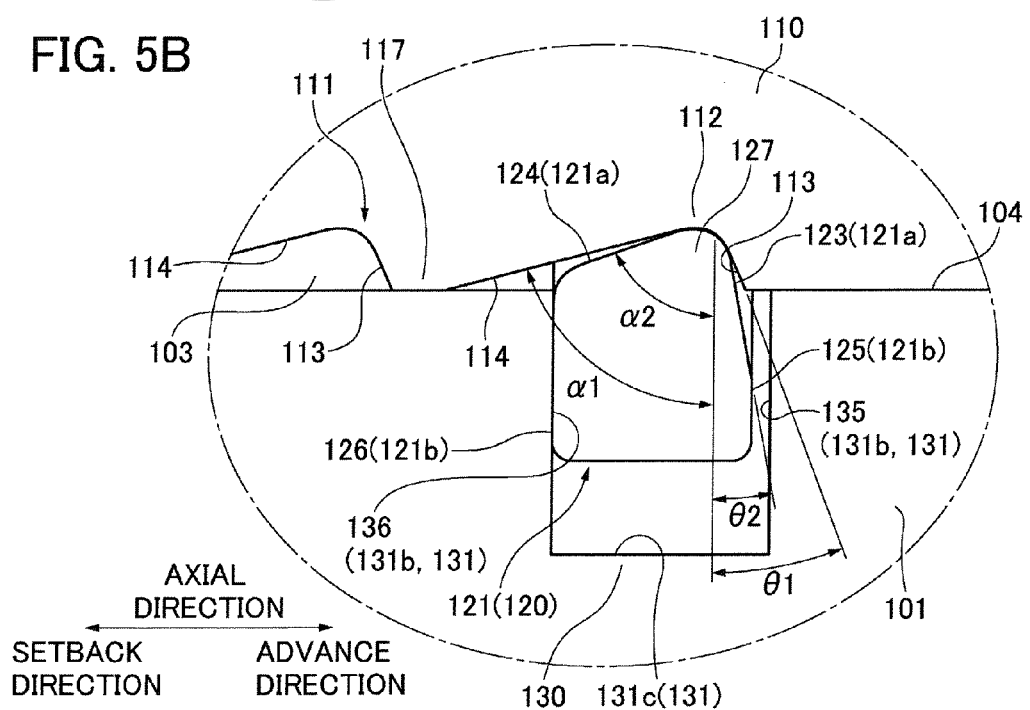
FIG. 5B is an enlarged view of a part of the tensioner indicated by the broken line circle VB in FIG. 5A.

As shown in FIG. 5B, the elastic ring 120 can restrict axial movement of the plunger 110 by engagement of a surface 121b of the ring 120 with a tooth of a rack 111 of circumferential teeth formed on the outside of the plunger 110 by a series of circumferential grooves 112.

FIGS. 2 through 5B show the plunger 110 in its initial, maximum setback position, with the elastic ring 120 disposed in a foremost one of the circumferential grooves 112, and retained in a radially contracted condition by a ring-diameter retaining tool 160.

Oil is supplied to the oil chamber 105 through oil supply passage 102 under pressure from the engine oil pump or other source which is activated when the engine is in operation and deactivated when the engine is stopped.

The plunger 110 is biased in the protruding direction both by the plunger-biasing spring 106 and by the pressure of the oil within the oil chamber 105. Leakage of oil from the high pressure oil chamber damps the force exerted by the chain on the plunger 110 in the setback direction.

A check valve 150, which is assembled at the bottom end of the plunger-accommodating hole 103, allows oil to be introduced through the oil supply passage 102 to the oil chamber 105, but blocks reverse flow of oil from oil chamber 105 through the oil supply passage.

The check valve 150 comprises a ball seat 152 having an oil passage 151 that communicates with the oil supply passage 102, a check ball 153 that seats on the forward end of the ball seat 152, a spring 154 that presses the check ball 153 against the ball seat 152, and a retainer 155 that supports the spring 154 and restricts movement of the check ball 153.

The axis of the plunger 110, which, except for the circumferential grooves on its outer surface, is substantially cylindrical, coincides with the axis L plunger-accommodating hole 103.

Figure 4:
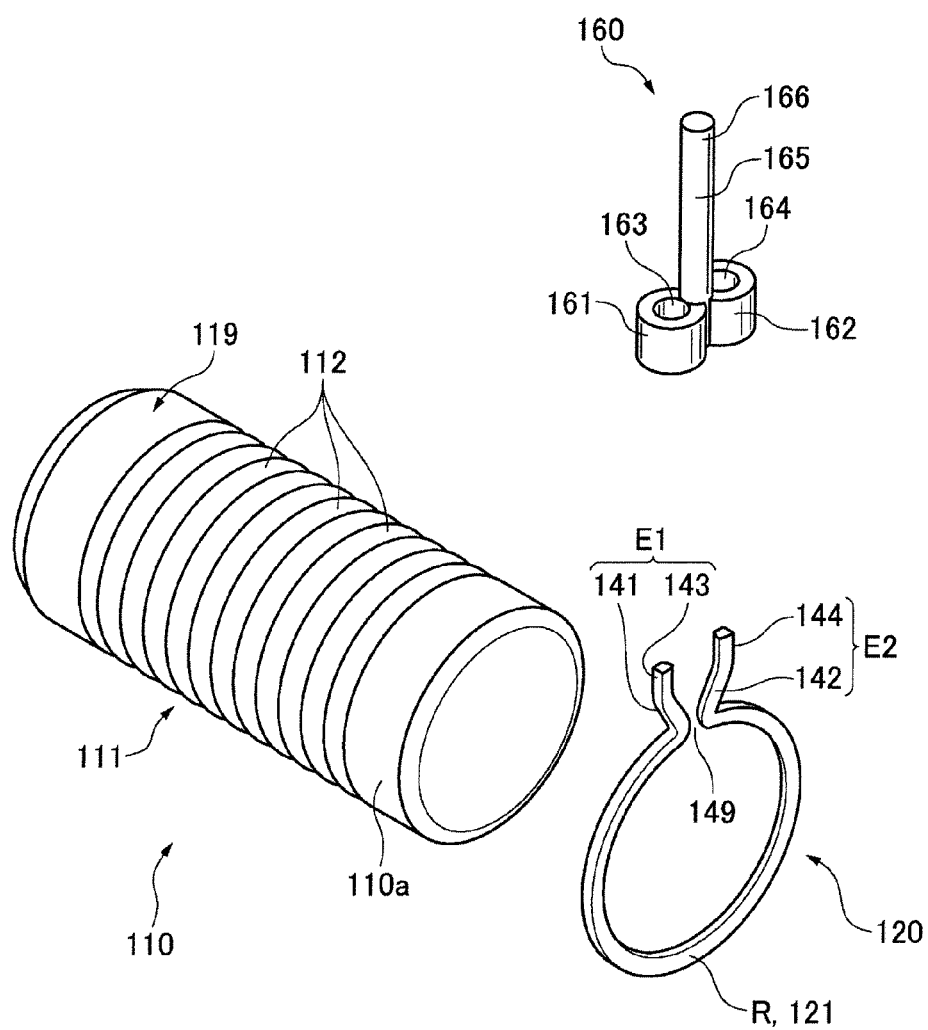
FIG. 4 is an exploded perspective view showing the plunger, an elastic ring and a ring diameter retainer of the tensioner in FIG. 1.

As seen in FIGS. 4 and 5A, the plunger 110 has a rack 111, the teeth of which can come into contact with a surface 121 of the elastic ring 120, and a cylindrical portion 119 for sliding contact with the wall 104 (FIG. 5A) of the plunger-accommodating hole in the tensioner housing so that the plunger is supported for reciprocating along axis L of the plunger-accommodating hole.

Each circumferential groove 112 on the plunger is an annular groove that extends all the way around the circumferential outer surface 110a of the plunger 110. As shown in FIG. 5B, each circumferential groove 112 has an inclined, rearward-facing, front surface 113 for contact with surface 121b of the elastic ring 120 as the plunger moves in the setback direction and an inclined, forward-facing surface 114 for contact with surface 121a of the elastic ring when the plunger 110 moves in the protruding direction. The inclined surfaces of the grooves on the plunger form rack teeth 117.

The profiles of inclined surfaces 113 and 114 in axial plane P1 (FIG. 3) are straight as shown in FIG. 5B, and the surfaces 113 and 114 of each groove 112 are connected by a concavely curved intermediate surface. As shown in FIG. 5B, the rearward-facing inclined surface 113 is disposed at an angle ∝1 with respect to a radial plane and is inclined forward proceeding radially outward from axis L. The forward-facing inclined surface 114 is disposed at an angle ∝1 relative to the same radial plane and is inclined rearward proceeding radially outward from axis L. Angle θ1 is smaller than angle ∝1.

An annular groove 130 is formed in the wall 104 of the plunger-accommodating hole, but is cut away at 140 to provide an opening 145 as shown in FIG. 3. The opening 145 extends radially from the groove 130 to the outside of the housing, and is open toward the protruding direction of the plunger as shown in FIG. 2.

As shown in FIG. 5, the side walls 131b of groove 130 are composed of opposed axially facing surfaces 135 and 136. A bottom surface 131c faces radially inward toward the plunger 110. The wall surfaces 135 and 136 have straight profiles and are disposed in planes orthogonal to axis L as shown in FIGS. 5A and 5B.

The elastic ring 120 allows the plunger 110 to advance under the biasing force exerted by the biasing spring 106 and the pressure of the oil within oil chamber 105, restricts setting back of the plunger unless the force exerted on the plunger by the chain exceeds a predetermined magnitude such that the action of the rearward-facing inclined groove surface 113 on the ring causes the ring to expand by an amount such that the ring can pass over the tooth formed at the tip of the surface 113 and move into a next groove on the plunger.

As shown in FIG. 4, the elastic ring 120 has a circular, arc-shaped portion R that almost completely surrounds the plunger 110 while the ring is situated in groove 130. The ring also has a pair of outwardly protruding ends E1 and E2 that extend through opening 145 so that they can be manipulated to expand or contract the diameter of the ring. The part of the ring that cooperates with the surfaces of the grooves on the plunger is in the circular, arc-shaped portion R.

In FIGS. 2, 3, 5A and 5B, the elastic ring 120 is in contact with both of the inclination surfaces 113 and 114 of a groove 112 on the plunger within the circumferential groove 112. Here the ring is expanded from its relaxed condition and held by a ring-diameter retaining tool 160 engaged with its protruding ends E1 and E2.

When the ring-diameter retaining tool 160 is removed, as shown in FIG. 1, the elastic ring 120 is partly within groove 130, and its surface 121b extends into the plunger-accommodating hole 103. If the plunger is present, the surfaces 121a of the ring extend into circumferential groove 112 of the plunger.

As shown in FIG. 5B, an inclined forward-facing ring surface 123 is connected to an inclined rearward facing ring surface 124 by an arcuate curve within a circumferential groove 112 of the plunger. The inclined surfaces 123 and 124 are located radially inward from radial abutment surfaces 125 and 126 respectively. Ring surface 123 can contact groove surface 113 and ring surface 124 can contact groove surface 114. The inclined ring surfaces 123 and 124 thus form a ratchet tooth 127 that is engageable with the rack teeth 117 on the plunger.

The angle 82 of the forward-facing inclined surface 123 of the ring is smaller than the angle ∝2 of the rearward-facing inclined surface 124. The angle θ2 is also smaller than the angle θ1 of the rearward facing surface of the groove 112 on the plunger, and angle ∝2 is smaller than the angle ∝1 of the forward facing surface of groove 112.

Radial surface 125 abuts wall surface 135 of groove 130 when the plunger advances and radial surface 126 abuts wall surface 136 of the groove when the plunger 110 sets back. As seen in FIG. 5B, therefore, the inclined surfaces 123 and 124 of the ring are tapered while the abutment surfaces 125 and 126 parallel to each other.

As shown in FIGS. 2 to 4, the ends E1 and E2 of the elastic ring 120 project approximately radially outward from the groove 130 and extend to the outside of the housing 101 through the cut-away portion 140. The respective ends E1 and E2 extend substantially parallel to an imaginary plane P2 (FIG. 5A) to which the axis L is perpendicular.

As shown in FIG. 4, the ends E1 and E2 have inclined portions 141 and 142 formed so that the distance between the portions 141 and 142 gradually increases proceeding radially outward toward the outside of the ring from the center thereof. The ends E1 and E2 then continue as parts 143 and 144, which are parallel to each other and to a radial line Lr (FIG. 3).

Figure 6:
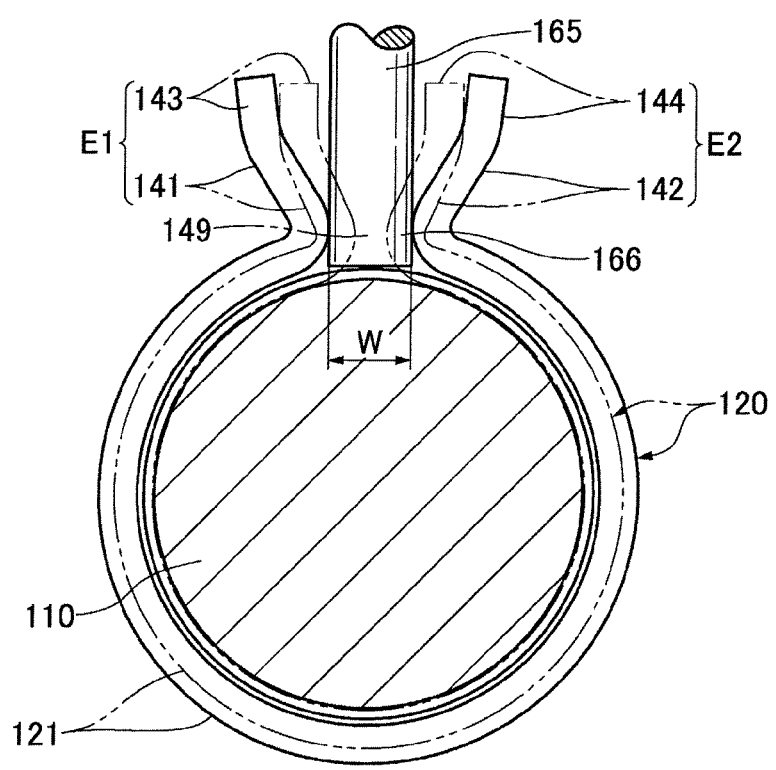
FIG. 6 is a diagram showing the elastic ring expanded by the ring-diameter retainer shown in FIG. 4.

The ring-diameter retaining tool 160 receives end portions 143 and 144, maintaining the ring in of the grooves of the rack 111 during assembly of the tensioner, during transportation of the tensioner, and while the tensioner is being installed on an engine. A circumferential groove 112 on the plunger is in contact with portions 123 and 124 of the ring while the ring-diameter retaining tool 160 is in place. As shown in FIG. 4, the tool comprises a pair of holding portions 161 and 162 having holding holes 163 and 164 through which parts 143 and 144 of ends E1 and E2 are inserted. The tool also includes a shaft 165, which can be gripped by an operator. An end portion 166 of the shaft can be inserted between the inclined parts 141 and 142 of ends E1 and E2 of the ring to expand the ring. The shaft 165 can have any of various cross-sectional shapes, e.g., circular as shown, square, or in the form of any other polygon As shown in FIG. 6, when part 166 of shaft 165 is inserted through the narrowest portion 149 of the gap between inclined portions 141 and 142 of the ring is smallest and is disposed between the both opening inclined portions 141 and 142, the ring is expanded. The width W of part 166 should be such that that the inner diameter of the ring becomes larger than the maximum outer diameter of the rack 111. FIG. 6 shows in solid lines the configuration of the ring when part 166 of tool 160 is inserted into the gap between parts 141 and 142, and in broken lines the configuration of the ring when it is in engagement with the rack teeth of the plunger before insertion of the tool 160.

When the plunger 110 is to be inserted into the plunger-accommodating hole 103 of the housing 101, the elastic ring 120 is first installed in groove 130. Then, the plunger 110 is inserted into the plunger-accommodating hole 103 while the elastic ring 120 is expanded by insertion of its expansion part 166 into the gap between inclined portions 141 and 142 of the ring. Then, the ring-diameter retaining tool 160 is removed.

The operation of the tensioner 100 is illustrated in FIGS. 7A-7D, 8A, 8B and 9A-9D.

Figure 7A:
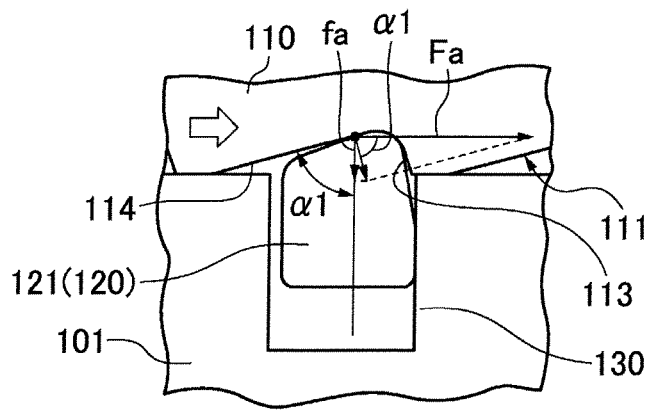
FIGS. 7A, 7B, 7C and 7D are diagrams illustrating sequential stages of the advancing movement of the plunger of the tensioner.
Figure 7B:
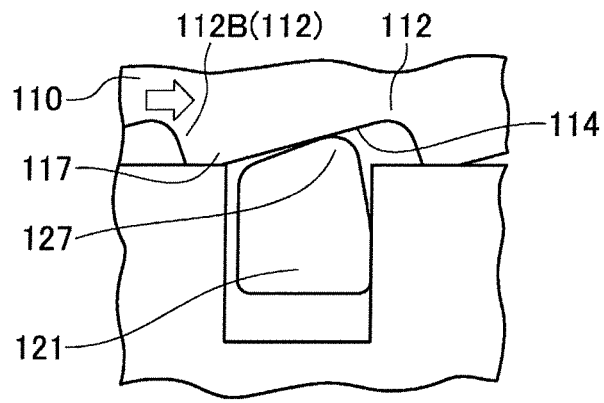
Figure 7C:
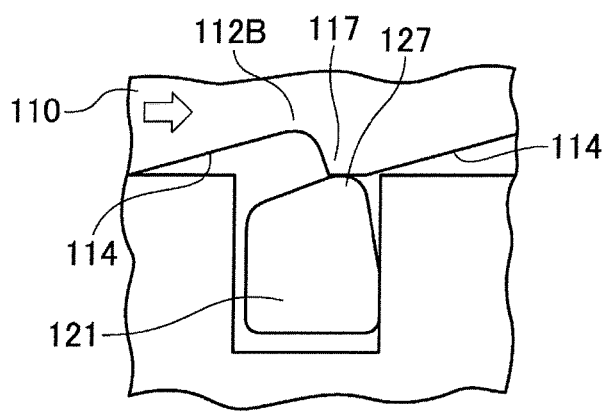
Figure 7D:
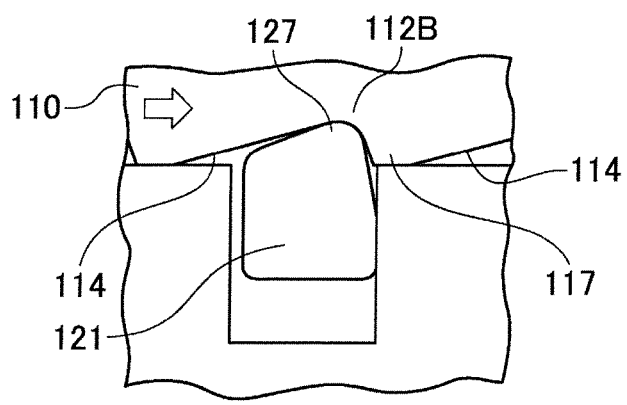

As shown in FIGS. 7A-7D, angle ∝1 of the forward-facing surface 114 is selected so that when the tension in the chain drops while the engine is operating, and the plunger 110 advances due to a force Fa exerted on the plunger 110 by the plunger-biasing spring 106 and by the hydraulic pressure of the oil within the oil chamber 105, a component force fa in the radial direction, acting on the ring through the inclined surface 114 of the rack 111, expands the ring as shown in FIG. 7B. The ratchet tooth 127 of the ring rides on the surface 114 and over the rack tooth 117 as shown in FIG. 7C dropping into a next adjacent circumferential groove 112B adjacent in the setback direction as the plunger moves in the protruding direction. The plunger may continue to advance, with the ring passing over additional rack teeth, until the force fa exerted on the ring is no longer sufficient to expand the ring. As a result of the advancing movement of the plunger 110, the tension in the chain is reestablished.

Figure 8A:
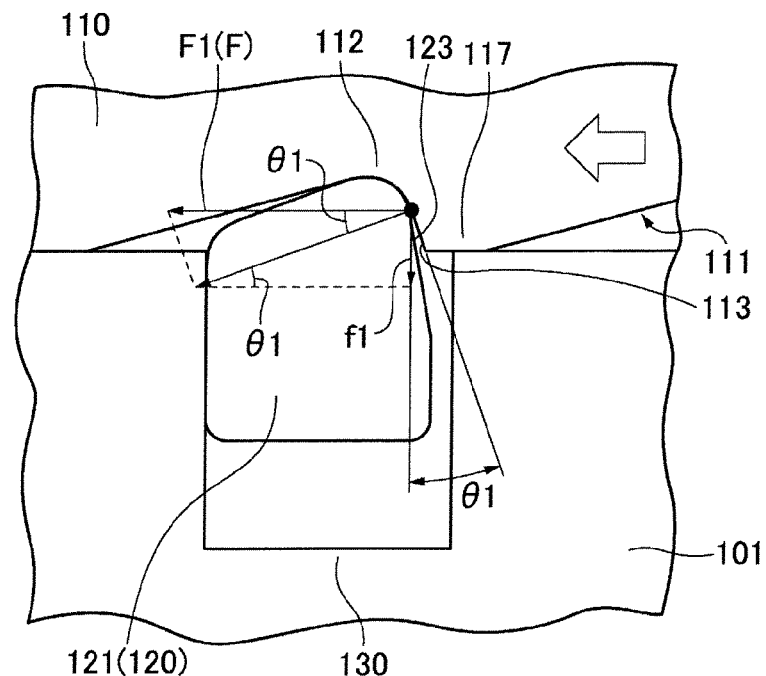
FIGS. 8A and 8B are diagrams illustrating the manner in which the ring blocks setting back movement of the plunger.
Figure 8B:
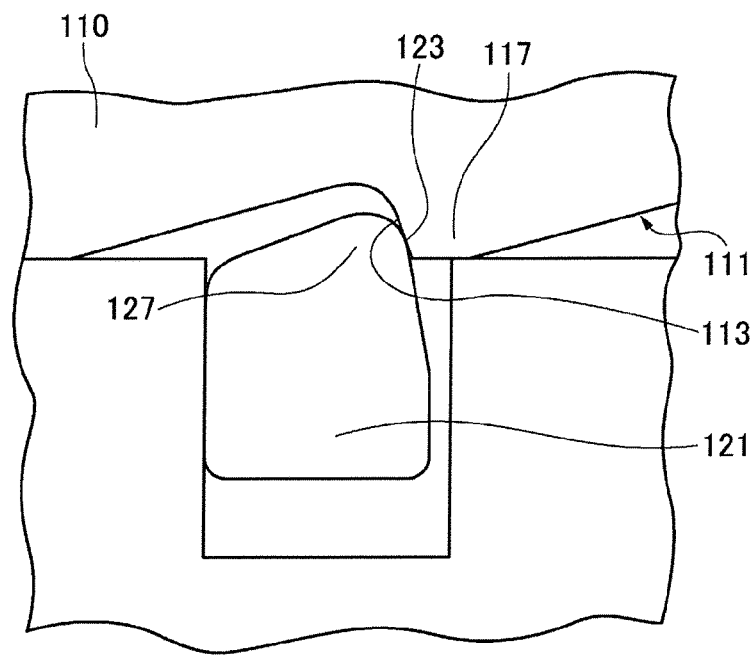

As shown in FIGS. 8A and 8B, angle θ1 is selected so that, when the tension in the chain increases and the force exerted on the plunger in the setback direction caused when the tension of the chain 6 at a level F1, i.e. a level smaller than a force corresponding to a predetermined excessive tension, the ring cannot ride over the rack tooth 117 even if the radial component f1 of the first reaction force F1 partially expands the ring as shown in FIG. 8B. Therefore, the engagement of surface 113 of the rack tooth with surface 123 of the ring prevents the plunger 110 from being set back. The plunger does not set back when the engine is started or during normal engine operation because the force exerted on the plunger in the setback direction is not excessive. Under these conditions, the movement of the plunger in the setback direction is limited to the tensioner's backlash. The angle 81 should be selected so that, setback is prevented during engine start-up even if air is present in the oil chamber of the tensioner, and also so that setback is prevented during normal engine operation even if the hydraulic pressure in the oil chamber 105 of the tensioner is low.

Figure 9A:
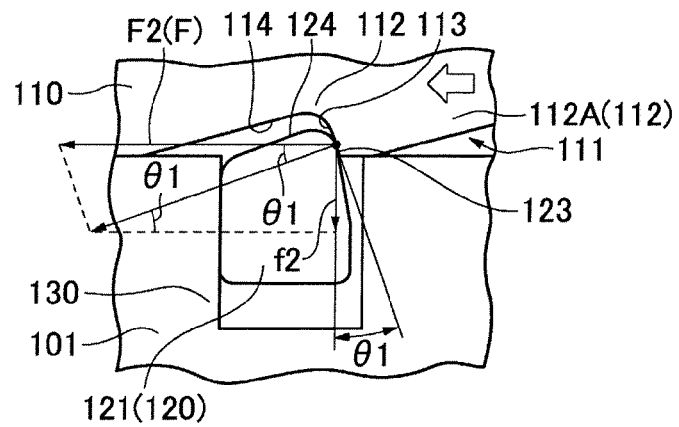
FIGS. 9A, 9B, 9C and 9D are diagrams illustrating sequential stages of the setting back movement of the plunger.
Figure 9B:
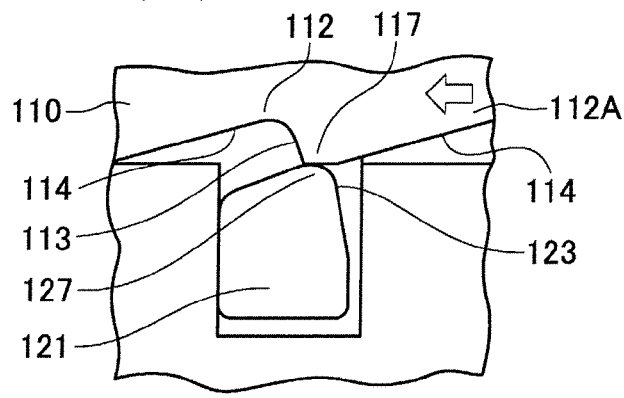
Figure 9C:
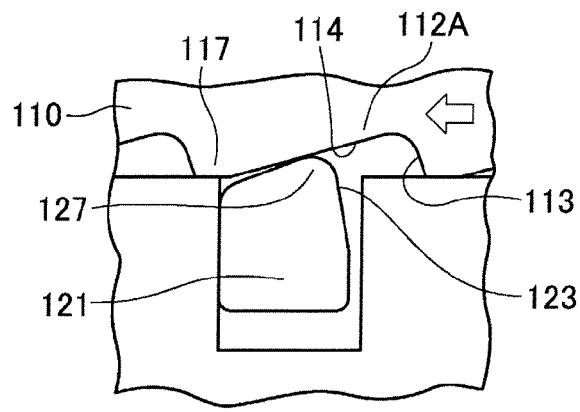
Figure 9D:
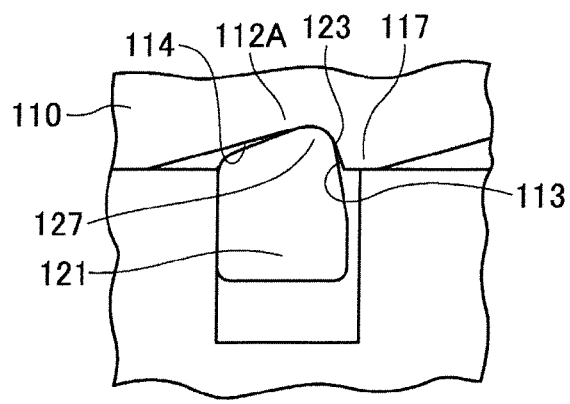
Figure 10:
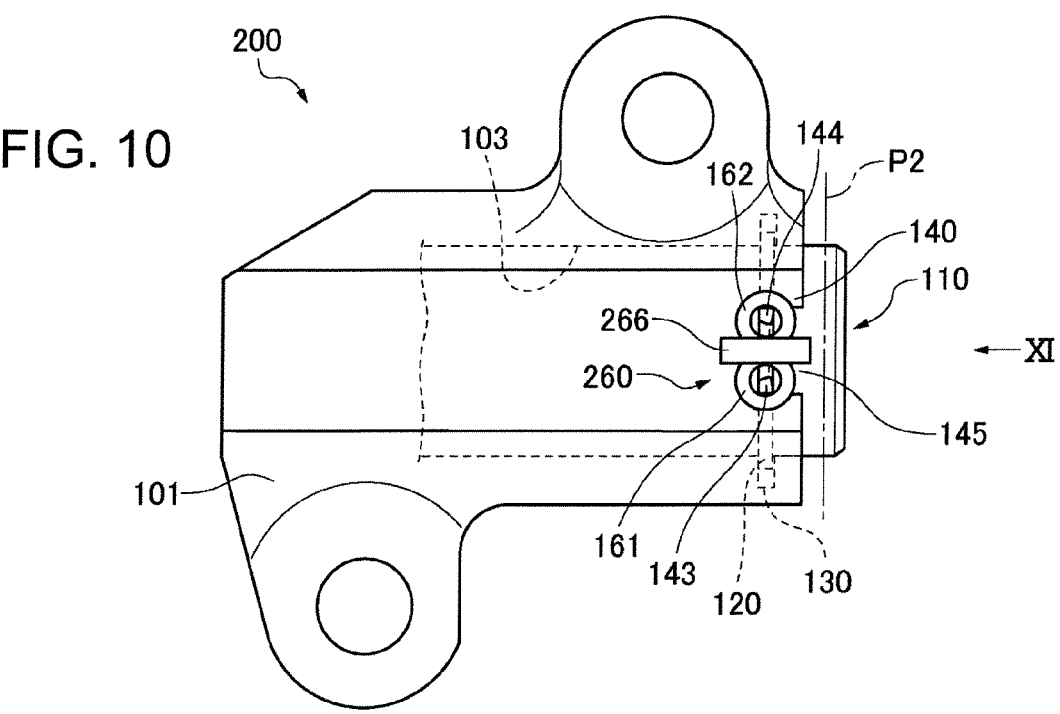
FIG. 10 is an elevation of a second embodiment of the tensioner as viewed along the direction of arrow X in FIG. 11.
Figure 11:
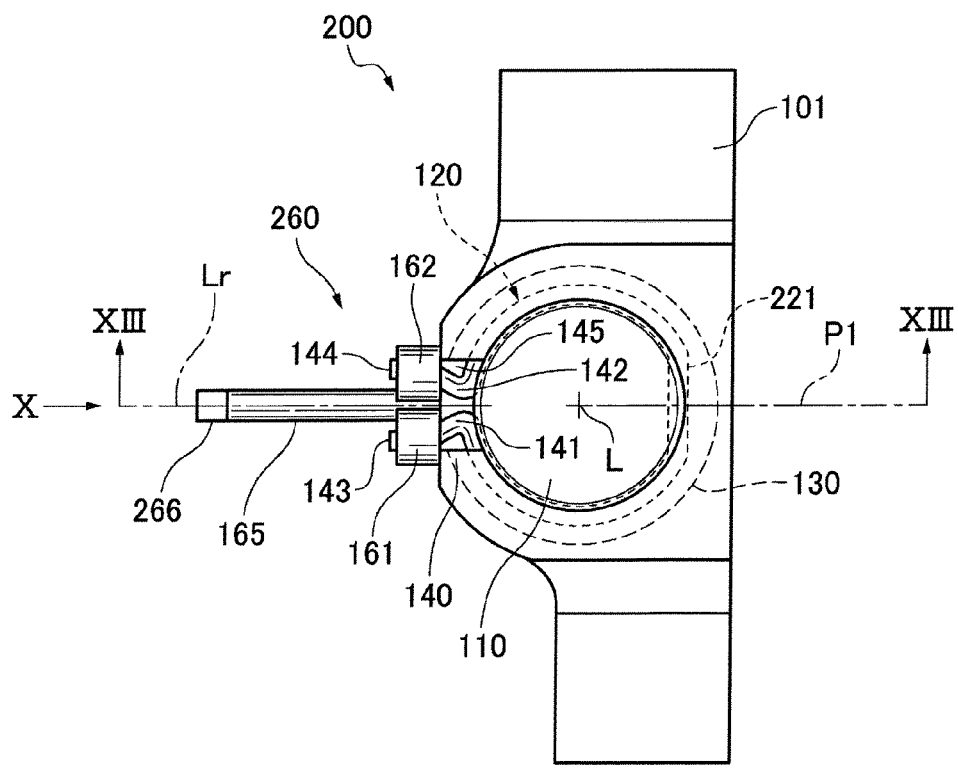
FIG. 11 is an elevational of the second embodiment of the tensioner as viewed along the direction of arrow XI in FIG. 10.

As shown in FIGS. 9A through 9D, the angle θ1 of the rearward facing surface 113 of the grooves of the plunger is selected so that when the tension in the chain becomes excessive, so that the force F acting on the plunger in the set back direction is at a higher magnitude F2, the radial component f2 exerted on the ring through rack surface 113 expands the ring as shown in FIG. 9A, allowing the rack tooth 117 to ride over the ring as shown in FIG. 9B so that the plunger continues to move in the set back direction and the ring falls into an adjacent circumferential groove 112A as shown in FIGS. 9C and 9D.

Here, F2 is the reaction force F that can be generated when the chain becomes loosen or elongates due to various causes such as fluctuations in chain tension, thermal expansion, etc. In such a case, the plunger can protrude excessively, resulting in excessive chain tension as engine operation continues.

When the tension of the chain 6 is excessive, the expansion of the ring allows the plunger to set back by one or more grooves until the force F exerted on the plunger in the set back direction is reduced below the level at which the ring can expand beyond the outer diameter of the plunger rack teeth. The plunger inclination angles ∝1 and θ1 are readily determined by experiment and simulation to allow the plunger to protrude and set back as required to meet the conditions in a particular engine.

Because the profiles of the ring abutting surfaces 125 and 126 that abut the groove wall surface 135 and 136 are straight rather than circular as in the case of a conventional elastic ring used in a tensioner, it is possible to reduce contact pressure, and thereby suppress wear of the ring and prevent bit-locking caused by wear. In addition, because surfaces 125 and 126 are planar surfaces and come into plane-to-plane contact with the surfaces 135 and 136 of the groove 130, friction acting on the ring as it ring expands when the plunger moves forward or backward is reduced compared the friction that acts when the abutting surfaces are tapered. Therefore, it is possible to improve the responsiveness of the tensioner in controlling the tension of the chain.

As mentioned previously the angle θ1 of the plunger surface 113 is set so that a force F1 exerted on the plunger does not result in setback, but a larger force F2 results in setback. With this arrangement, it is possible to reduce flapping noises in the chain and also to avoid the noises that occur when the chain is under excessive tension by preventing excessive tension from occurring.

The straight inclined surfaces 123 and 123 of the ring, and the fact that the angles of these surfaces are smaller than the angles of the surfaces of the grooves that they oppose, make it possible for the tensioner to perform in a manner similar to that of a tensioner having a ratchet piston.

The ring-diameter retaining tool 160, in cooperation with the ends E1 and E2 of the ring can be used to prevent the plunger 110 from moving in the axial direction and thereby prevent the plunger 110 from jumping out of the plunger-accommodating hole 103 while tensioner 100 is being transported and both before and during assembly or installation of the tensioner 100. The ends E1 and E2 are held by the ring-diameter retaining tool 160 by inserting the parallel parts 143 and 144 of the ends through the holes 163 and 164 of the holding portions 161 and 162.

The portion 166 of the tool can be inserted between the inclined parts 141 and 142 of the ends E1 and E2 of the ring 120 to expand the ring so it is disengaged from the rack teeth, enabling the plunger to be either inserted or removed from the plunger-accommodating hole easily, and thereby facilitating assembly and maintenance of the tensioner. The inclination of parts 131 and 142 facilitates the insertion of the tool portion 166.

In a second embodiment of the invention, shown in FIGS. 10 through 14, a rack 211 composed of grooves 212 (FIG. 12) extends axially along a part of the outer circumferential surface 110a of a plunger 110 in a ring-type tensioner 200. The grooves 212 are straight, parallel grooves extend parallel to a plane P2 (FIG. 10) orthogonal to the axis L (FIG. 13A) of the plunger and the plunger-accommodating hole.

Figure 13A:
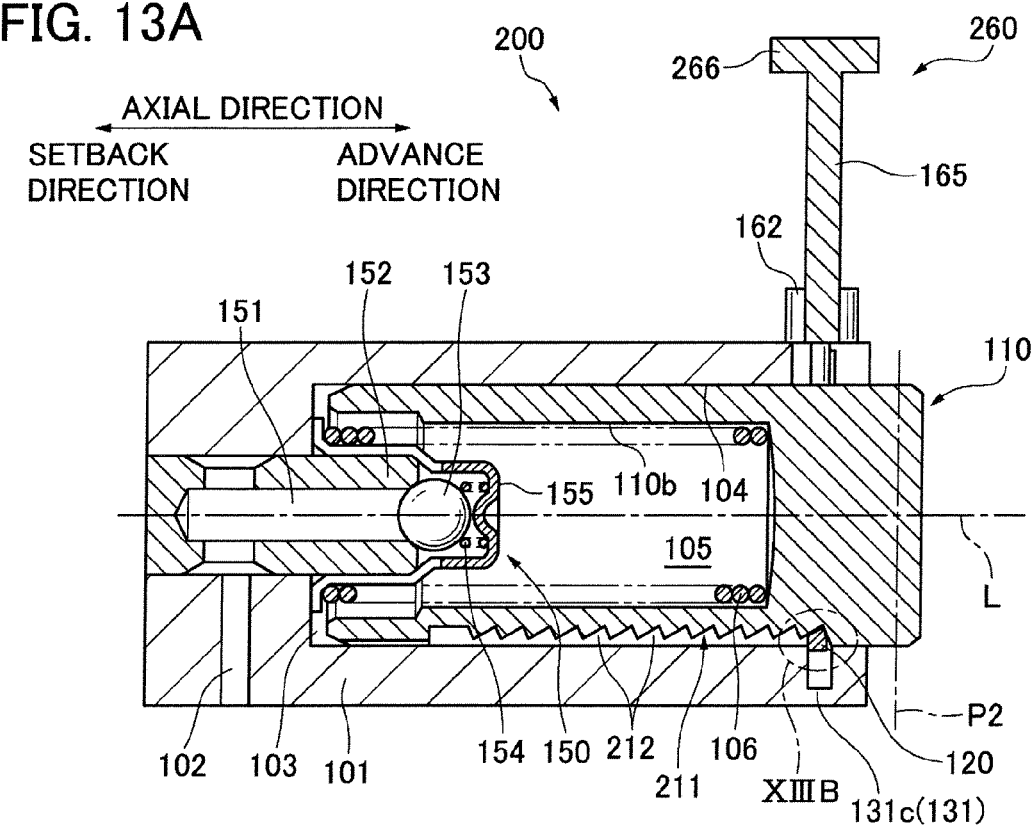
FIG. 13A is a section view of the tensioner taken on plane XIII-XIII in FIG. 11.
Figure 13B:
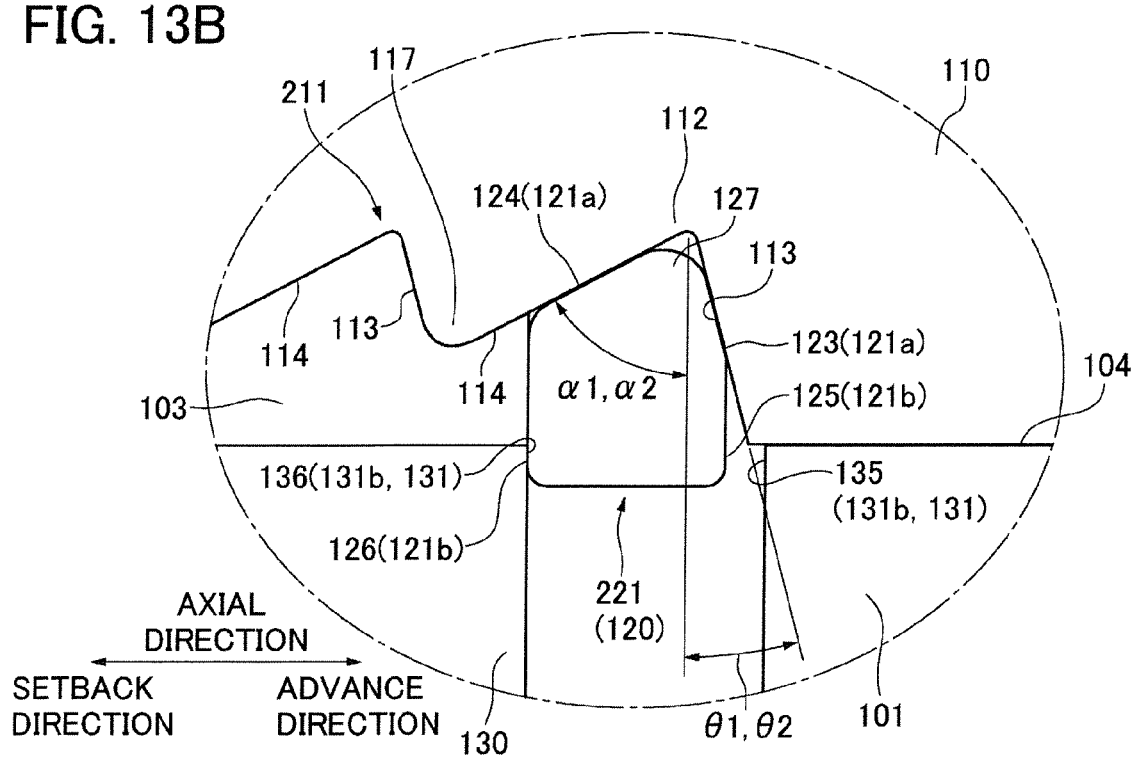
FIG. 13B is an enlarged view of a part of the tensioner of the second embodiment, indicated by the broken line circle XIIIB in FIG. 13A.

As shown in FIG. 13B, in this embodiment, the angle 02 of the forward-facing inclined surface 123 of the ring is equal to the angle θ1 of the rearward-facing surface 113 of the groove 112 in the plunger. Likewise, the angle ∝2 of the rearward-facing surface of the ring is equal to angle ∝1 of the forward facing surface of the groove 112. Ring surface 221 is straight and parallel to the plunger axis. Therefore, the cross-section R of the rack-engaging portion of the elastic ring 120 is D-shaped.

The elastic ring 120 of the second embodiment has substantially the same profile as that of the ring of the first embodiment, and functions in a similar manner as long as the straight portion 221 of the ring has an inclined forward-facing surface 123, an inclined rearward-facing surface 124, a forward facing radial abutment surface 125 a rearward facing radial abutment surface 126.

Figure 12:
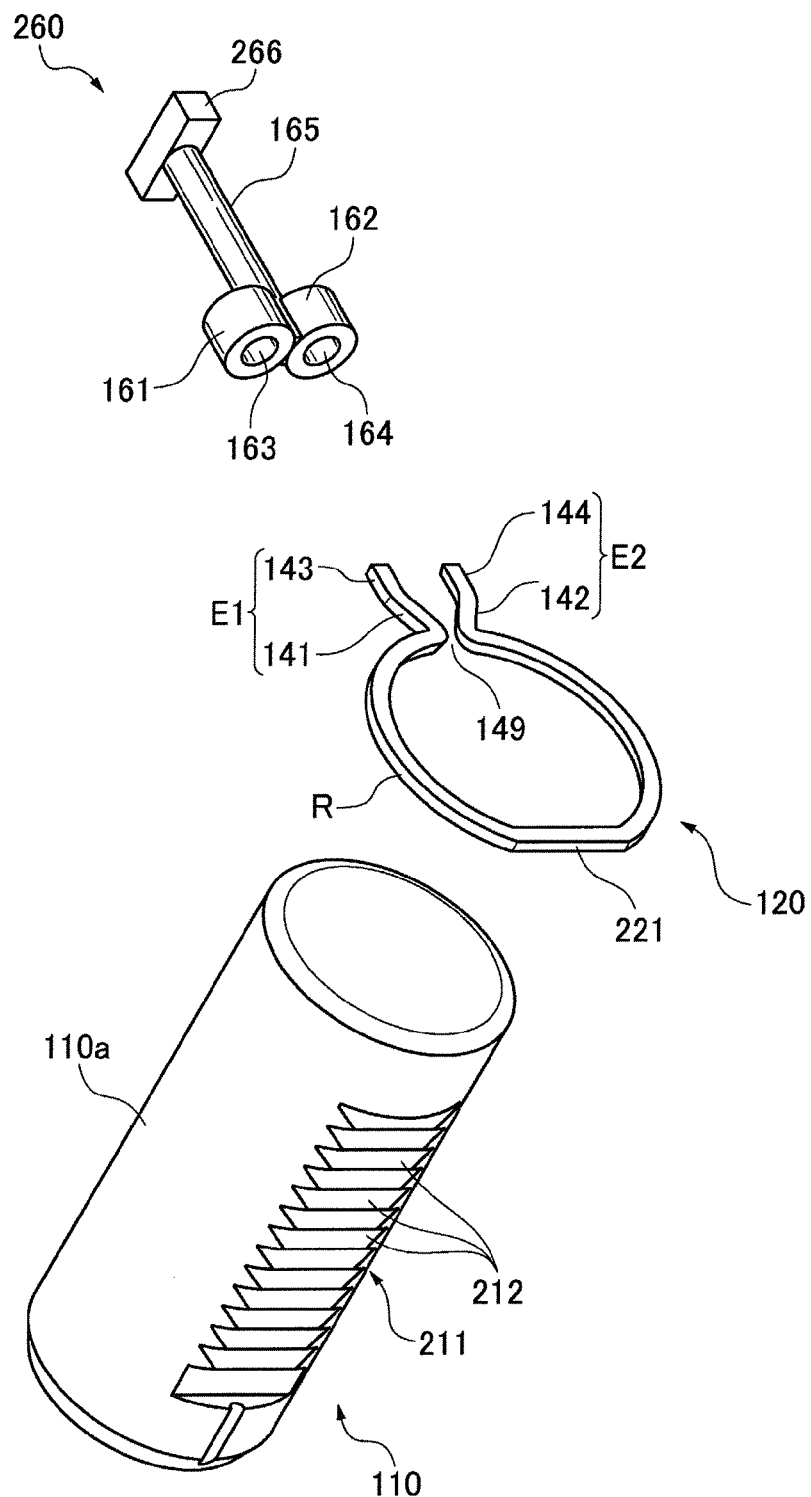
FIG. 12 is an exploded perspective view of the plunger, the elastic ring and the ring diameter retainer of the tensioner of FIG. 10.

In the second embodiment, as shown in FIG. 12, a ring-diameter retaining tool 260 has a pair of engagement holding portions 161 and 162 with holes 163 and 164 for receiving ends E1 and E2 of the ring. The tool also has a shaft 165 with a part 266 which can be used as a grip.

Figure 14:
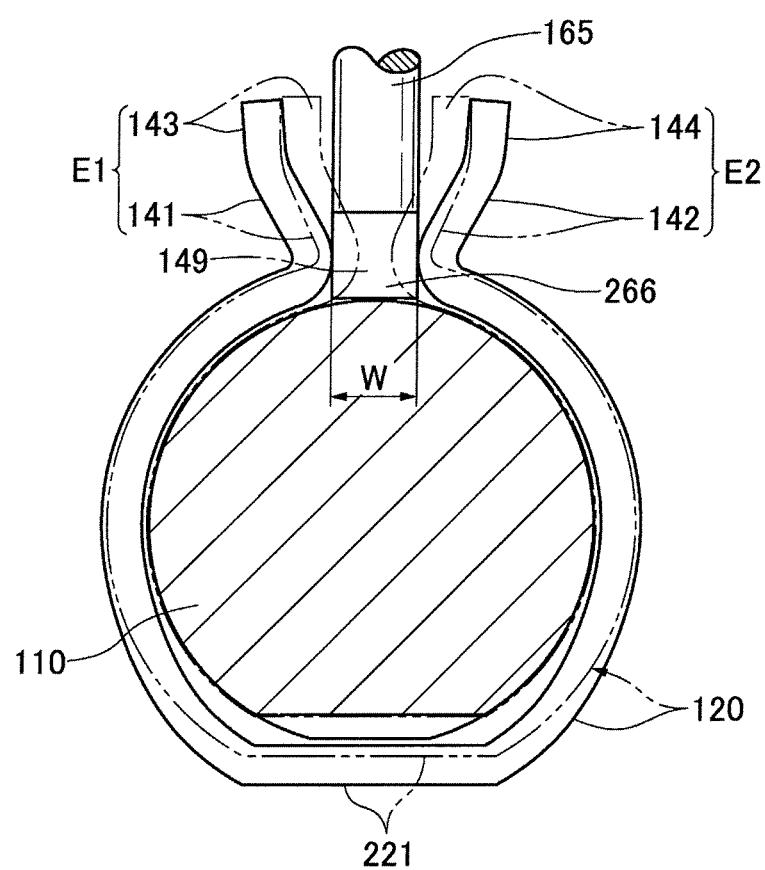
FIG. 14 is a diagram showing the elastic ring expanded by the ring-diameter retainer shown in FIG. 12.

As shown in FIG. 14, the part 266 is in the shape of an elongated rectangular parallelepiped that can be readily disposed between the inclined parts 141 and 142 of the ring. When the ring is expanded by insertion of part 266 into the gap between inclined parts 141 and 142, the ring can be expanded so that part 221 is disengaged from the rack 111. The engaged position of the ring is shown in broken lines and the disengaged position of the ring is shown in solid lines.

In the second embodiment, the contact pressure between the engaged surfaces of the straight part 221 of the ring and the rack teeth is reduced because the equality of the angles θ1 and θ2 and the equality of angles ∝1 and ∝1 results in area contact, and a significant suppression of wear.

Figure 15:
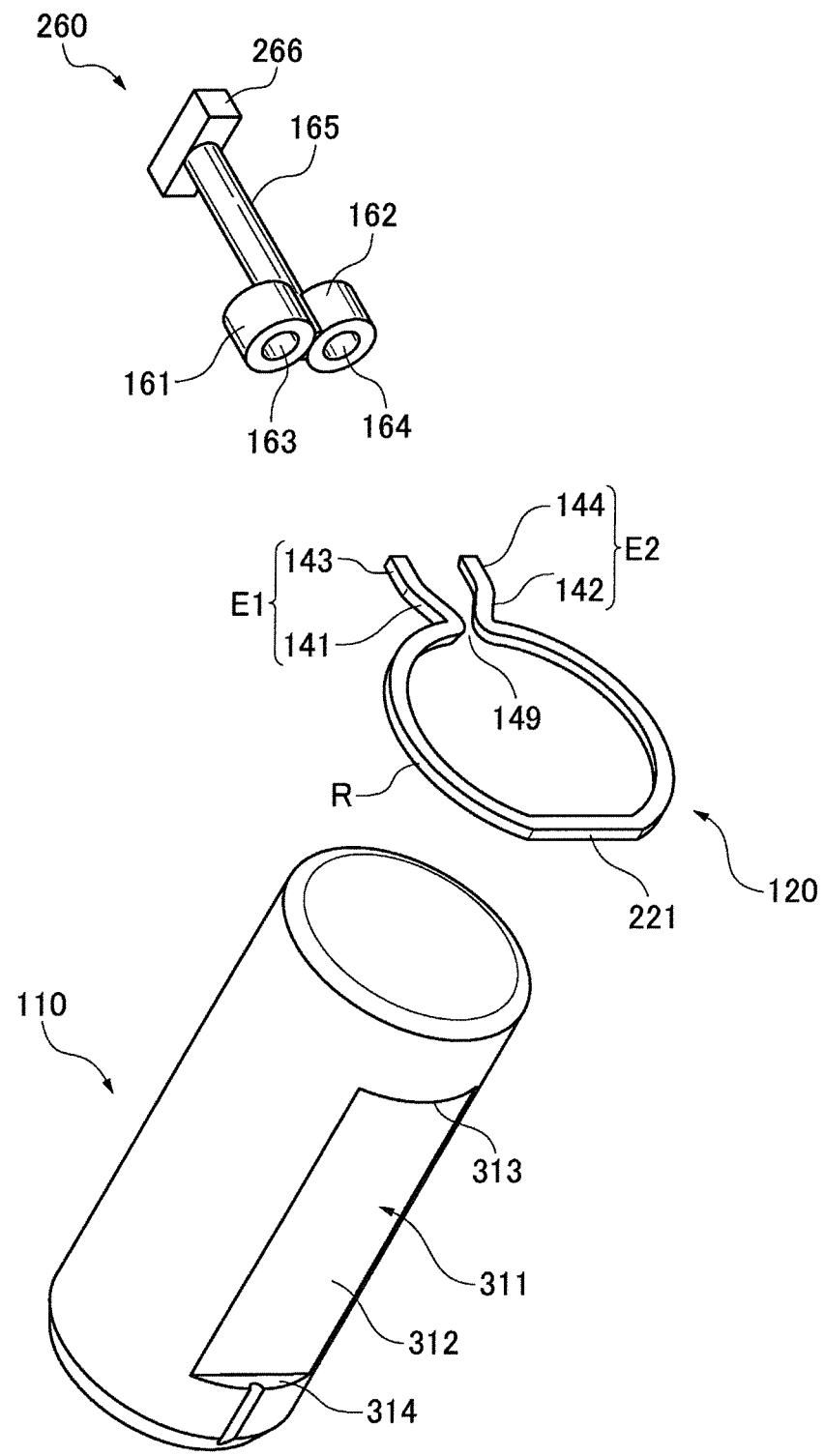
FIG. 15 is an exploded perspective view showing the plunger, the elastic ring, and the ring diameter retainer of a tensioner according to a third embodiment of the invention.
Figure 16A:
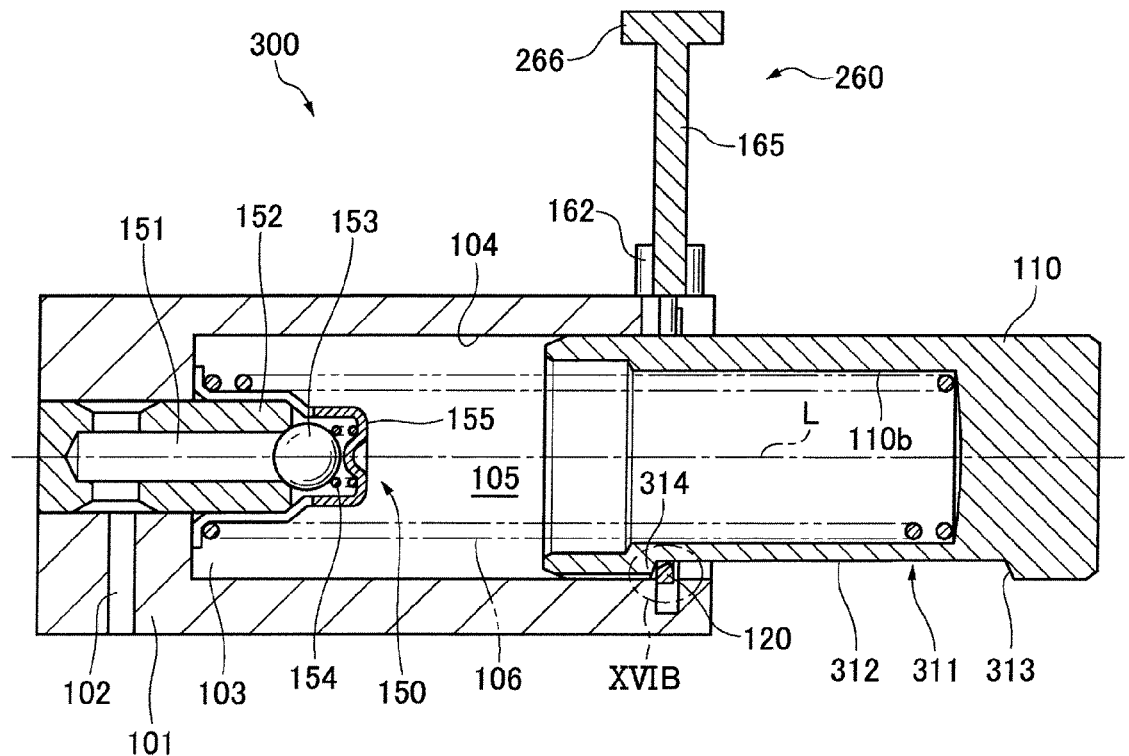
FIG. 16A is a longitudinal cross section of the ring-type tensioner according to the third embodiment of the invention, showing the plunger in its most advanced position.
Figure 16B:
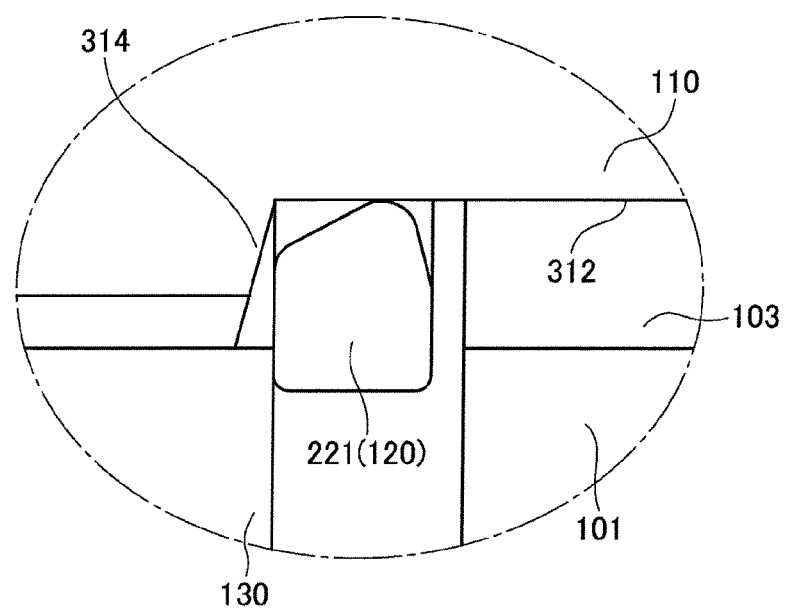
FIG. 16B is an enlarged view of a part of the tensioner of FIG. 16A, indicated by the broken line circle XVIB in FIG. 16A.

In a third embodiment, shown in FIGS. 15 and 16, the plunger 310 of tensioner 300 has no rack. The plunger 310 has a cut-away portion 311 having a flat surface 312, a setback stop surface 313 located at the front end of the cut-away portion 311 that defines an initial position (or a maximum setback position) and an portion 314 at the rear-end of the cutaway portion 311 that defines the maximum protruding position of the plunger.

The ring abutment portion 221 of the elastic ring 120 is the same as that of the second embodiment, and can block the plunger 110 from setting back from its initial position and also block the plunger from advancing beyond a maximum advancing position, thereby preventing the plunger from being pulled out of the housing 101 as shown in FIG. 16A. A ring-diameter retaining tool for expanding the elastic ring 120 of the tensioner of the third embodiment is the same as the tool 260 of the second embodiment, shown in FIG. 12.

Various modifications can be made to the embodiments described above. For example the ring can be manipulated for expansion and contraction by parts other than ends E1 and E2. The ring-diameter retaining tool 260 can be used in the first embodiment instead of the ring-diameter retaining tool 160. The ring-diameter retaining tool 160 can also be used in the second and third embodiments instead of the ring-diameter retaining tool 260.

The chain can be a chain other than a timing chain, e.g., a chain that drives auxiliary machine components in an engine or a chain in a transmission mechanism of a machine other than an engine.

In a tensioner in which the rack engaging surface 121 of the ring does not ride over a rearward-facing surface of a rack tooth when the plunger sets back due to a large reaction force F2, the rack-engaging surface can be parallel to the plane P2 to which the plunger axis is perpendicular.

In the third embodiment, the profile of part 221 of the elastic ring 120 can be circular.

The tensioner can be used not only in a chain transmission, but also in a belt transmission.

The part or parts of other parts of the elastic ring can be different from the profile of the part that engages the rack teeth or the end surfaces of a cut-away portion of the plunger.

What is claimed is:

1. A ring-type tensioner, comprising:
a housing having a plunger-accommodating hole having an axis;
a plunger extending into, and protruding from, the plunger-accommodating hole, and movable therein along the direction of said axis for maintaining tension in a flexible traveling transmission medium;
a biasing spring for biasing the plunger in its protruding direction; and
an elastic ring disposed around the plunger and capable of radial expansion and contraction;
wherein the tensioner is arranged to restrict the movement of the plunger in the axial direction by engagement of an engagement surface of the plunger with an engagement portion of the elastic ring;
wherein a portion of the elastic ring is disposed within a groove in a circumferential wall of the plunger-accommodating hole, the groove having a radial wall and the ring having a radial abutment surface arranged to abut the radial wall surface of the groove; and
wherein the profile of the radial ring surface in an axial plane containing the axis of the plunger-accommodating hole is straight;
wherein the engagement surface of the plunger is a surface of one of a plurality of grooves formed on the plunger the grooves being disposed at intervals along the direction of said axis;
wherein each of the grooves of said plurality is a circumferential groove curved in the circumferential direction;
wherein the engagement portion of the elastic ring is composed of forward-facing and rearward-facing surfaces;
wherein the engagement surface of the plunger is also composed of forward-facing and rearward-facing surfaces;
wherein the forward facing radial wall of the groove in the plunger-accommodating hole is disposed for face-to-face contact with the ring when the plunger is moved in the setting back direction, and is curved in the circumferential direction of the said groove in the plunger-accommodating hole;
wherein each of the grooves on the plunger has a rearward-facing inclined surface for contacting the ring when the plunger sets back, and a forward-facing inclined surface for contact with the ring when the plunger advances;
wherein the angle of the rearward-facing inclined surface of each groove relative to a radial plane to which the axis of the plunger-accommodating hole is perpendicular is sufficiently small to block setback movement of the plunger when a first force is applied to the plunger, but sufficiently large to allow setback movement of the plunger when a second force greater than said first force is applied to the plunger;
whereby the plunger can set back when a predetermined excessive tension is generated in an endless traveling transmission medium in which tension is maintained by the tensioner, but is prevented from setting back when the tension in the transmission medium is lower than said predetermined excessive tension; and
wherein the ring has an inclined forward-facing surface arranged to contact the rearward-facing inclined surface of a groove in the plunger, and a rearward-facing inclined surface arranged to contact the forward-facing inclined surface of a groove in the plunger;
wherein each of said inclined surfaces of the ring and the plunger has a straight profile;
wherein the angle of the rearward-facing inclined surface of each groove in the plunger is smaller than the angle of the forward-facing inclined surface of the same groove in the plunger;
wherein the angle of the forward-facing inclined surface of the ring is smaller than the angle of the rearward-facing inclined surface of the ring;
wherein the angle of the forward-facing inclined surface of the ring is smaller than the angle of the rearward facing inclined surface of each of said grooves; and
wherein the angle of the rearward-facing inclined surface of the ring is smaller than the angle of the forward facing inclined surface of each of said grooves;
said angles being measured relative to a radial plane to which the axis of the plunger-accommodating hole is perpendicular.

2. A ring-type tensioner, comprising:
a housing having a plunger-accommodating hole having an axis;
a plunger extending into, and protruding from, the plunger-accommodating hole, and movable therein along the direction of said axis for maintaining tension in a flexible traveling transmission medium;
a biasing spring for biasing the plunger in its protruding direction; and an elastic ring disposed around the plunger and capable of radial expansion and contraction;

wherein the tensioner is arranged to restrict the movement of the plunger in the axial direction by engagement of an engagement surface of the plunger with an engagement portion of the elastic ring;

wherein a portion of the elastic ring is disposed within a groove in a circumferential wall of the plunger-accommodating hole, the groove having a radial wall and the ring having a radial abutment surface arranged to abut the radial wall surface of the groove; and wherein the profile of the radial ring surface in an axial plane containing the axis of the plunger-accommodating hole is straight;

wherein the engagement surface of the plunger is a surface of one of a plurality of grooves formed on the plunger the grooves being disposed at intervals along the direction of said axis;

wherein each of the grooves of said plurality is a circumferential groove curved in the circumferential direction;

wherein the engagement portion of the elastic ring is composed of forward-facing and rearward-facing surfaces;

wherein the engagement surface of the plunger is also composed of forward-facing and rearward-facing surfaces;

wherein the forward facing radial wall of the groove in the plunger-accommodating hole is disposed for face-to-face contact with the ring when the plunger is moved in the setting back direction, and is curved in the circumferential direction of the said groove in the plunger-accommodating hole;

wherein each of the grooves on the plunger has a rearward-facing inclined surface for contacting the ring when the plunger sets back, and a forward-facing inclined surface for contact with the ring when the plunger advances;

wherein the angle of the rearward-facing inclined surface of each groove relative to a radial plane to which the axis of the plunger-accommodating hole is perpendicular is sufficiently small to block setback movement of the plunger when a first force is applied to the plunger, but sufficiently large to allow setback movement of the plunger when a second force greater than said first force is applied to the plunger;

whereby the plunger can set back when a predetermined excessive tension is generated in an endless traveling transmission medium in which tension is maintained by the tensioner, but is prevented from setting back when the tension in the transmission medium is lower than said predetermined excessive tension; and wherein the ring has an inclined forward-facing surface arranged to contact the rearward-facing inclined surface of a groove in the plunger, and a rearward-facing inclined surface arranged to contact the forward-facing inclined surface of a groove in the plunger;

wherein each of said inclined surfaces of the ring and the plunger has a straight profile;

wherein the angle of the rearward-facing inclined surface of each groove in the plunger is smaller than the angle of the forward-facing inclined surface of the same groove in the plunger;

wherein the angle of the forward-facing inclined surface of the ring is greater than the angle of the rearward-facing inclined surface of the ring;

wherein the angle of the forward-facing inclined surface of the ring is equal to the angle of the rearward facing inclined surface of each of said grooves; and wherein the angle of the rearward-facing inclined surface of the ring is equal to the angle of the forward facing inclined surface of each of said grooves;

said angles being measured relative to a radial plane to which the axis of the plunger-accommodating hole is perpendicular.

3. A ring-type tensioner, comprising:

a housing having a plunger-accommodating hole having an axis;

a plunger extending into, and protruding from, the plunger-accommodating hole, and movable therein along the direction of said axis for maintaining tension in a flexible traveling transmission medium;

a biasing spring for biasing the plunger in its protruding direction; and an elastic ring disposed around the plunger and capable of radial expansion and contraction;

wherein the tensioner is arranged to restrict the movement of the plunger in the axial direction by engagement of an engagement surface of the plunger with an engagement portion of the elastic ring;

wherein a portion of the elastic ring is disposed within a groove in a circumferential wall of the Plunger-accommodating hole, the groove having a radial wall and the ring having a radial abutment surface arranged to abut the radial wall surface of the groove;

wherein the profile of the radial ring surface in an axial plane containing the axis of the plunger-accommodating hole is straight; and wherein the elastic ring has manipulable parts for manual expansion or contraction the ring, and including a ring-diameter retaining tool engaged with said manipulable parts and holding said manipulable parts in fixed relation to each other whereby the ring is prevented from expanding sufficiently to allow the ring to disengage a groove of the plunger in which it is situated, and the plunger is thereby prevented from moving axially out of the plunger-accommodating hole.

4. The ring-type tensioner according to claim 3, wherein the manipulable parts of the ring are located on the ring so that they are separated from each other circumferentially by a gap when the ring is in engagement with a groove of the plunger and the ring diameter retaining tool is not retaining said manipulable parts in fixed relation to each other, and wherein the ring-diameter retaining tool includes a part insertable into said gap when the tool is not retaining said manipulable parts in fixed relation to each other, the thickness of the insertable part of the tool being larger than said gap, and sufficiently large to expand the ring to a diameter greater than the maximum diameter of the plunger at the locations of the grooves, whereby, by insertion of the insertable part of the tool into said gap, the plunger can be released from the ring and allowed to move axially in the plunger-accommodating hole.

* * * * *